United States Patent
Harris

(10) Patent No.: US 8,893,873 B1
(45) Date of Patent: Nov. 25, 2014

(54) MATERIAL HANDLING FEED TABLE

(75) Inventor: Doug Harris, Pryor, OK (US)

(73) Assignee: HE&M Inc., Pryor, OK (US)

( * ) Notice: Subject to any disclaimer, the term of this patent is extended or adjusted under 35 U.S.C. 154(b) by 89 days.

(21) Appl. No.: 13/431,194

(22) Filed: Mar. 27, 2012

(51) Int. Cl.
*B65G 19/00* (2006.01)
*B65G 25/00* (2006.01)

(52) U.S. Cl.
CPC .............. *B65G 19/00* (2013.01); *B65G 25/00* (2013.01)
USPC ........ 198/345.1; 198/604; 198/747; 198/748; 198/575

(58) Field of Classification Search
USPC ........... 198/345.1, 346.2, 604, 736, 738, 747, 198/748, 780–791; 83/801
See application file for complete search history.

(56) References Cited

U.S. PATENT DOCUMENTS

| | | |
|---|---|---|
| 2,654,463 A | 10/1953 | Church |
| 2,974,794 A | 3/1961 | Fry |
| 3,138,238 A | 6/1964 | Good et al. |
| 3,247,949 A | 4/1966 | McDougall |
| 3,763,991 A | 10/1973 | Batik |
| 3,841,462 A * | 10/1974 | Schmidt ..................... 198/345.1 |
| 3,947,902 A | 4/1976 | Conde et al. |
| 4,223,609 A | 9/1980 | Montagner |
| 4,240,538 A * | 12/1980 | Hawkes et al. ................ 198/358 |
| 4,331,228 A * | 5/1982 | Galarowic ............... 198/781.02 |
| 5,070,751 A | 12/1991 | Harris |
| 5,299,480 A | 4/1994 | Harris et al. |
| 5,353,910 A | 10/1994 | Harris et al. |
| 5,366,064 A | 11/1994 | Gamberini et al. |
| 5,398,484 A | 3/1995 | Kader |
| 5,460,083 A | 10/1995 | Hutchinson et al. |
| 5,526,727 A | 6/1996 | Richards et al. |
| 5,562,197 A | 10/1996 | Vaphiadis |
| 5,634,397 A | 6/1997 | Hutchinson et al. |
| 5,680,936 A * | 10/1997 | Beers ........................... 209/564 |
| 5,787,774 A | 8/1998 | Richards et al. |
| 5,944,477 A * | 8/1999 | Shill ............................. 414/788 |
| 6,212,437 B1 | 4/2001 | Harris |
| 6,588,574 B2 | 7/2003 | Koini et al. |
| 6,698,159 B2 | 3/2004 | Harris et al. |
| 6,865,973 B1 | 3/2005 | Hasegawa |
| 7,036,411 B1 | 5/2006 | Harris et al. |
| 7,073,420 B2 * | 7/2006 | Kuo ............................... 83/112 |
| 7,111,720 B1 | 9/2006 | Harris |
| 7,275,633 B2 | 10/2007 | Zimmermann |
| 2010/0126826 A1 | 5/2010 | Lundahl et al. |

* cited by examiner

*Primary Examiner* — Mark A Deuble
(74) *Attorney, Agent, or Firm* — Head, Johnson & Kachigian, P.C.

(57) ABSTRACT

A material handling feed table having a driven conveyor mechanism to move a work piece. A reciprocating shuttle mechanism clamps and moves the work piece. A mechanism is provided to coordinate and operate movement of the driven conveyor mechanism in conjunction with the movement of the reciprocating shuttle mechanism.

8 Claims, 6 Drawing Sheets

MATERIAL HANDLING FEED TABLE

BACKGROUND OF THE INVENTION

1. Field of the Invention

The present invention is directed to a method and apparatus for a material handling feed table wherein movement of a reciprocating shuttle device is coordinated with movement of driven rollers.

2. Prior Art

Many industries require solid materials to be delivered to or taken from a process machine or equipment. One example would be a machine operation such as cutting a length of material on a band saw. The material may be a single piece, such as a large ingot, or a bundle of pieces weighing up to 20,000 lbs. This work is often accomplished by the use of some type of conveyor, a mechanism that moves materials with the aid of rollers, bearings, or other anti-friction devices built into its structure. A conveyor saves energy as those anti-friction devices help move the mass of the material, while more or less rigid structure supports the material's weight.

A conveyor is often called by a descriptive name. For instance, a conveyor used to carry away the results of a process might be called a discharge conveyor, product conveyor, or the like. Similarly, a conveyor used to carry material towards a process might be called an input or in-feed conveyor.

It is also common to add a descriptive term regarding the construction to the name of the conveyor. One example of a descriptive name is the so-called feeding table, or feed table.

The present invention is directed to a feed table conveyor. This device is called a table because, in the simplest form, it has a more or less horizontal top surface that the supports the material placed upon it. Once the table has been loaded, the material can be translated or moved over the table's surface towards the process.

One of the simplest types of feeding tables is known as a roller table. Rollers are cylindrical structures, having a main axis running concentric to the curved outer shell and through the centers of the circular ends. The construction may vary but the strength of the roller must support the load that it is to move. The weight of the material on a roller is supported by surface of the rollers pushing up at the points of contact. This roller is most often mounted on an axle or shaft coaxial to the main axis and the curved outer shell. It is around this axle that the shell revolves during use. The axles transfer the forces applied roller to the supporting structure through bearings, which not only anchor the roller in place but also permit the shell to rotate.

A roller table is an array of rollers with their axles parallel to each other. The rollers are positioned so that the top of each roller is coplanar, that is to say that they are tangent to a single plane. This upper tangent plane between the rollers defines the top of the table and is more or less horizontal. Material placed on this conveyor can translated freely in only one direction, parallel to the top plane and transverse to the roll axis. The material is moved while the supporting rollers rotate about their axles.

One example of a roller table is seen in Assignee's U.S. Pat. No. 5,353,910 for a Shuttle Vise Assembly for a Feed Table Apparatus.

Movement is made easier if the material to be processed has at least one more or less planar surface. In use, the material is turned to place the planar surface against the feed table's top surface, or if there is no suitable planar surface, the material can be placed on or anchored to a carrier, which provides a smoother surface to help the material pass over the table. The carrier can be modular, like a machining jig, or continuous, like a conveyor belt.

The roller table is particularly suited for moving material of undefined length and a more or less constant width or cross-section, such as a beam. The material can be translated axially down any length of table, while the length of the main axis of the rollers need only to be just longer than the width of the material, so it is completely supported. The roller array forming the top of the table can extend as far as needed to carry the material through the process. The conveyor can be built as a single roller array supported by one continuous structure or a collection of roller arrays, aligned to be collinear and coplanar, and supported by independent structures. Because of the linear configuration of this roller array, it is often called a line and is often constructed as a series of smaller roller tables.

The material may be pushed or pulled down the length of a roller table, with idling rollers only turned by the passing contact of the material. In this manner, the rollers are only used to support the weight of the material and to reduce the moving force by reducing friction and nothing else.

Alternatively, it is often convenient to use the rollers themselves to drive the material by using a powered drive system to turn one or more rollers. The force to translate the material comes from traction derived from the friction between the rollers and the material surfaces. This method requires no special connection between the work pieces. The material is simply placed on the conveyor and held against the rollers by gravity. The location or number of pieces of material on the table does not affect the movement. Work pieces can be advanced into one process and the product carried away to another process on a continuation of the same line. The speeds of segments or zones along the length of the table can change independent of the speeds in other zones.

The main advantages of using a power roller conveyor as a feed table include ease of use and speed to load and unload. They can move material relatively quickly as the motion is continuous. The load is distributed along the length of the conveyor. If a more or less constant weight per unit length is maintained, so that a greater material mass results in a greater length, then weight is spread over more rollers and the local supporting load, the stress on any structural section remains more or less constant. Movement is limited by the power to overcome inertia and friction.

One drawback of roller conveyors is that they have limited control over the exact position of the material. Many processes require that the feeding tables deliver material to a specific working zone in precisely measured increments or to an exact position. As only the friction between the work piece and the powered rollers drives the material and that friction varies with surface condition, there is no sure relationship between the movement of the rollers and the movement of the material. This is partly because, the material travels along a more or less linear path, while the roller surface follows a circular path.

As a single point on the surface of the roller revolves about the center axis, its lateral velocity changes. When the point is near the top tangent point, the velocity is approximately the same as the passing material. When the point rolls towards the side, the lateral velocity decreases to zero. Then as the point passes the side and rolls towards the bottom its speed increases to equal its speed at the top but it is traveling in the opposite direction. The point then decelerates again and reverses direction to accelerate back to the material speed as it reaches the top of the roll.

In theory, the material velocity and the surface speed of the roller will be equal where they touch at a single tangent point.

In practice, the exact speed and point of contact is uncertain. There are always some surface distortions that result from the contact forces, so the material surface is never plane and the roller surface is not truly cylindrical where they meet. The resulting variations in surface velocities cause the distorted surfaces at the interface to creep, first one way, then the other, as they pass. Also, at any time, there are small variations in speeds between different rollers, due to manufacturing tolerances of the drive components. Since the contact points of the transported material are linked together as a single more or less rigid body and there is some elasticity in all components, the velocity of the work piece becomes a rough average of the tangential velocities of all rollers in contact at the movement and the absolute position of the work piece uncertain.

One solution to the positioning problem is to employ a secondary measurement device, driven by the motion of the work piece. This, however, adds complexity and may be subject to some of the slippage issues previously described.

A more common method is to abandon the driven rollers and directly drive the material. Free rollers are still used to support the weight with the rollers turning passively as the material travel over them. This is often accomplished by using a traveling clamping device to anchor a driving mechanism to the work piece. This clamp is often called a shuttle vise as in practice, its traveling distance is limited and the vise must be repositioned, recycling back along the length toward its starting position when the clamp reaches the limits of its travel. The work piece must be held in position as the clamp moves to a new position before re-engaging.

One non-limiting example would be a band saw for cutting material into desired lengths. While the saw blade is cutting, the shuttle vise is released from the material and is moved back to the desired clamping position.

The vise firmly anchors the work piece to the drive mechanism, making its actual position more certain. The main disadvantage of the shuttle vise is that its motion cannot be continuous. If only one shuttle vise is used then the vise and the material must accelerate and decelerate, repeatedly, if the length of the piece to be fed exceeds the remaining travel length of the shuttle. The constant starting and stopping and the force of dragging material over rollers puts extra stress on the drive mechanism. If the work piece is heavy enough, these forces may create measurement inaccuracies or require additional materials and structures to re-enforce the shuttle.

The use of a single shuttle vise also slows the movement of long pieces of material as it requires a dwell time where the material stops and waits while the vise recycles. The motion control is complicated, but multiple shuttles can be used, by coordinating their movements, to allow any length material to pass without stopping. This is accomplished by working the vises in a hand-after-hand fashion, with one vise recycling while another continues to pull.

A problem, from an operational point of view, is that the material to be fed must be placed within reach of the shuttle system. Often a powered roller table can be used to bring new material to a point where the vise can clamp on to the piece. The problem is that as the shuttle clamps on and starts to pull the material forward, the rollers of the powered roller table tend to drag on the portion of the material that they still support.

The usual solutions to these problems have not always been satisfactory. Clutches can decouple the drive motors from the roller mechanisms, but the remaining component often will produce considerable drag. It is common that the tangential force that is required to turn the rollers may exceed the friction developed from the weight of the material applied to the surface of the rollers. In this state, the material will slide and drag over the rollers rather than be carried by turning rollers. Even when the rollers turn, the force of turning adds a considerable load to the shuttle while the material is in motion. They can be viewed as a series of small flywheels. Their rotational inertia causes them to resist acceleration and deceleration, effectively adding to the mass that the shuttle must move.

In addition, a traditional power roller system may contain a section that includes a common shuttle vise conveyor. An operator might wish to drive material quickly though this section without using the shuttle. Then, the un-powered section of rollers will not help move the material. In fact, the un-powered rollers can cause the material to stall if the traction force of the portion of the material supported by the powered rollers is not enough to drive it over the un-powered rollers. This often happens if the transported piece is short enough that it touches few or no powered rollers, or too few rollers to drive it. A cambered piece that does not set flat on the roller table can cause the same problem. The only way to continue to move the material is to stop using the powered rollers, and instead use the shuttle vise to move the piece.

Accordingly, it is an object and purpose of the present invention to provide a material handling feed table having both a series of driven rollers and a powered shuttle vise.

It is a further object and purpose of the present invention to provide a method or process to coordinate movement of a series of driven rollers with movement of a powered shuttle vise.

The present invention describes a feed table that includes the elements of both a powered roller table and at least one shuttling vise. All of the rollers, including the section where the shuttle vise or vises reciprocates, are powered. The roller conveyor can carry material quickly to the process equipment, when the clamping elements of the vises are withdrawn, since the roller array extends throughout the entire feed table.

When greater precision is required, the roller table can carry the work piece to the waiting shuttle vise system, but once the shuttle has clamped, the roller table mode changes to follow the motion of the shuttle. Instead of supporting the material on un-power rollers that passively follow the motion of the material, or require the material to simply slide if they don't turn free enough, these rollers are actively driven to follow the motion of the shuttle. This uses the ordinarily idle roller drive to eliminate the friction experienced by the shuttle vise, which in turn reduces the stress on the shuttle.

Additionally, the actively turning rollers would help lift the material as surface irregularities contact the rollers. When the contact surface of the material being moved is not smooth, these irregularities may drop below the tangent line of the rollers and into the void or voids between the rollers. As the material moves, these irregularities will sooner or later meet a roller surface. Once in contact, the roller will force this material back to the tangent line as the motion continues. Since the material is more or less rigid, this requires the roller to lift at least part of the material's weight. As the irregularity passes over the roller and continues on, the irregularity will drop into the next void. In shuttle systems without powered rollers, the extra power needed to lift an irregularity over a roller results in additional load retarding the motion of the shuttle. Conversely, as the irregularity drops into the void, the previously lifted weight tries to push the shuttle ahead. Irregularities occur randomly of any real surface, and these random loads are added to the existing friction and inertial loads to increase uncertainty.

It is a further object and purpose of the present invention to provide a material handling feed table wherein the speed of driven rollers is matched to the speed of a reciprocating shuttle.

An initial goal would be to match the shuttle speed, to minimize the difference between the speed of the transported material and the tangential surface speed of the roller. This should reduce and virtually eliminate the rolling friction, roller inertia, and reduce the effects of surface irregularities.

A motion control algorithm for the shuttle minimizes the pulling loads by smoothly accelerating and decelerating the shuttle and the load. The roller velocity should follow this same pattern. Once the motion program is determined then, as the shuttle starts to move, the actual position and velocity from the measurement system is used as feedback to insure that the program is accurately followed. This operation of error measurement and correction is continued throughout the motion program. If at any time the shuttle is moving too fast or too slow, the control will adjust the power to the drive powering the shuttle, to keep the motion on the program and deliver the work piece to its new position.

The roller drive will follow the commands of the shuttle but will also watch the actual speed of the rollers for any error between that and the shuttle's speed and adjust its output to match the speed and minimize slippage between the rollers and the material. The roller table will carry part of the load that results from surface irregularities. The traction between the material and a roller surface will help pull and lift the material, to ease their passage.

Since the roller conveyor drive is powerful enough to move the material by itself, when combined with the shuttle there is an excess of power available to move the material. The roller table can then share the work of moving the work piece, reducing the stress on and deformation of the shuttle vise and its associated measuring system, and reducing the uncertainty as the material is positioned in the processes work zone. The shuttle directly controls the motion of the material being moved by the roller table, providing only enough force to correct the motion, to improve the conveyors accuracy.

SUMMARY OF THE INVENTION

The present invention is directed to a material handling feed table for clamping and feeding elongated work pieces. A reciprocating shuttle mechanism is used to clamp the material and then move it to a desired point for processing such as cutting. The reciprocating shuttle mechanism includes a pair of opposed jaws or clamps. The reciprocating shuttle mechanism moves in directions roughly parallel to the axis of the material to be moved. The reciprocating shuttle mechanism includes a shuttle frame from which the jaws extend and retract. The shuttle frame, and, accordingly, the jaws are reciprocated by gears, a screw drive mechanism or a continuous loop chain or chains.

Additionally, a driven conveyor mechanism supports the work piece and moves it. The conveyor mechanism includes a plurality of axially aligned rollers which are rotated by a power roller drive motor. The tangential speed of the rollers is coordinated and operated in conjunction with movement and positioning of the reciprocating shuttle mechanism.

In a primary preferred embodiment, the shuttle mechanism is the primary conveyor. A motion controller directs power to a shuttle motor. A linear encoder provides feedback to the motion controller.

The driven conveyor mechanism is used as the secondary conveyor. A roller motor drives the conveyor and is coupled to the roller array. A secondary motion controller drives the roller motor at a rate such that the tangential velocity of the rollers matches the linear speed of the shuttle.

A rotary encoder obtains and produces a roller feedback signal which is compared to the shuttle feedback signal from the linear encoder. The secondary motion controller uses the error or difference between the two velocity signals to further refine the speed signal sent to the rolling conveyor drive motor.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
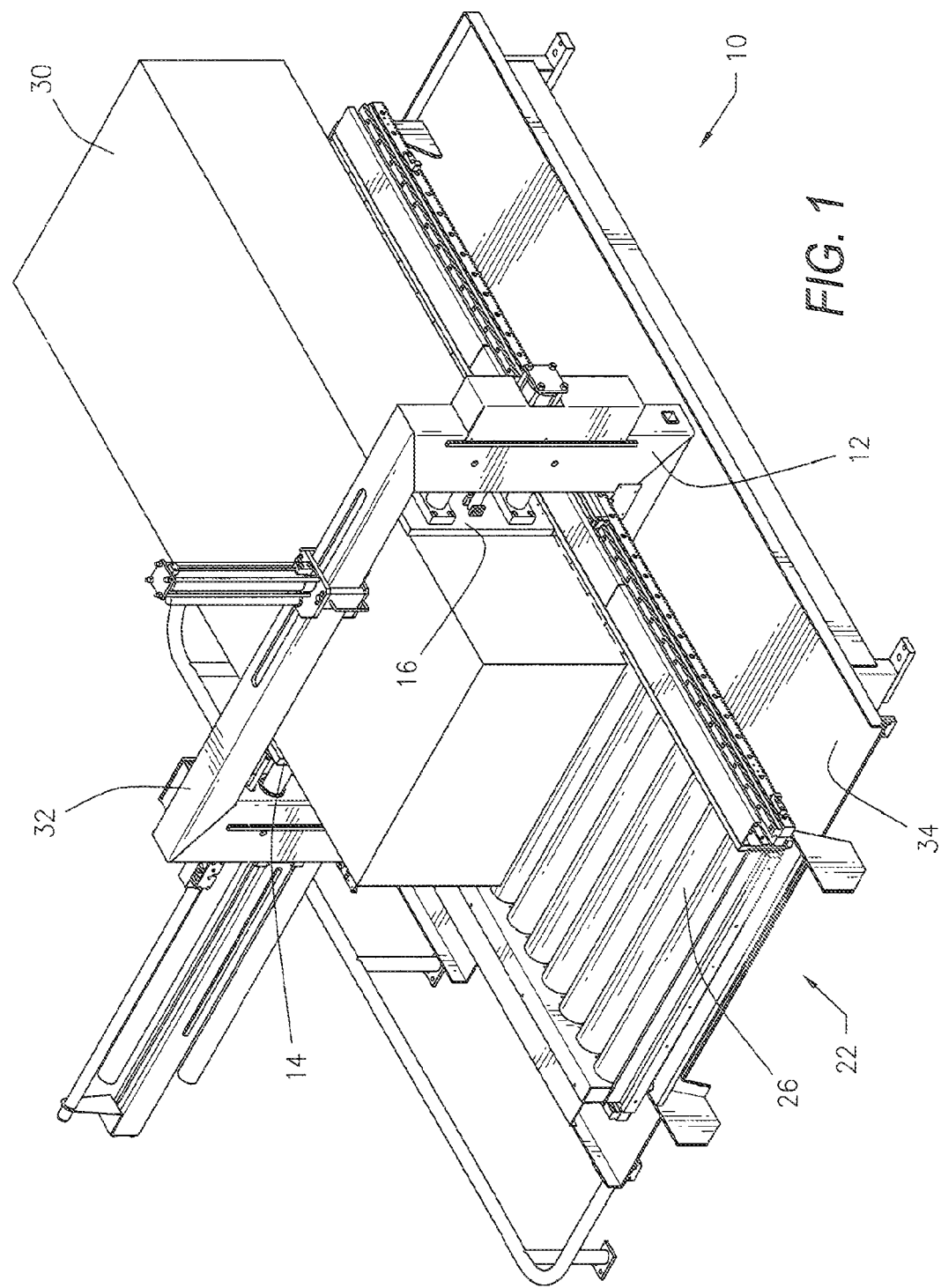
FIG. 1 illustrates a perspective view of a first preferred embodiment of a material handling table constructed in accordance with the present invention.
Figure 2:
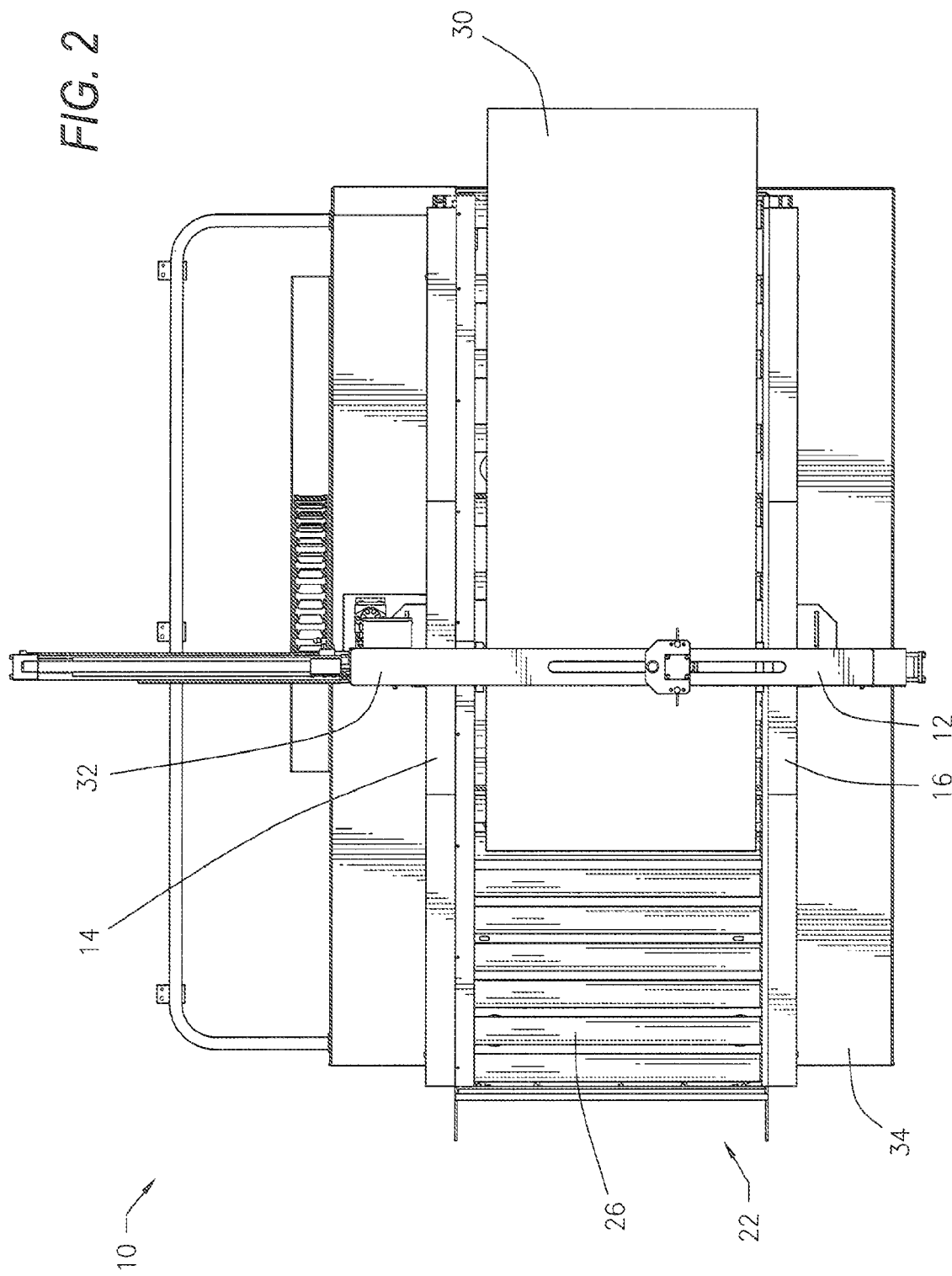
FIG. 2 illustrates a top view of the material handling feed table shown in FIG. 1.

Referring to the drawings in detail, FIG. 1 illustrates a perspective view and FIG. 2 illustrates a top view of a material handling feed table 10 for clamping and feeding elongated work pieces to a band saw or other tool. The material may be a single elongated piece or multiple pieces and is shown diagrammatically as a block 30. As will be described herein in detail, a reciprocating shuttle mechanism 12 is used to clamp the material 30 and then move it to a desired point at which the material will be cut. The process is automated and repeated until the work piece material 30 is fully utilized.

The reciprocating shuttle mechanism 12 includes a pair of opposed jaws or clamps 14 and 16. The reciprocating shuttle mechanism moves in directions roughly parallel to the axis of the material 30 to be moved.

The reciprocating shuttle mechanism includes a shuttle frame 32 from which the jaws extend and retract.

Figure 3:
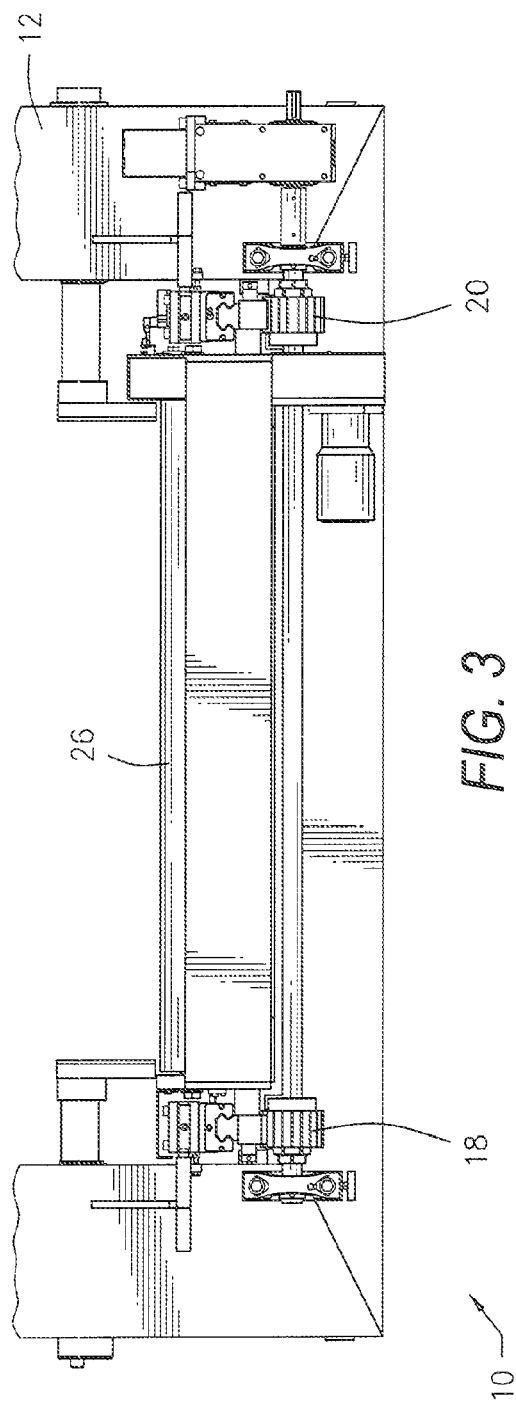
FIG. 3 is a front view of the material handling feed table shown in FIG. 1.
Figure 5:
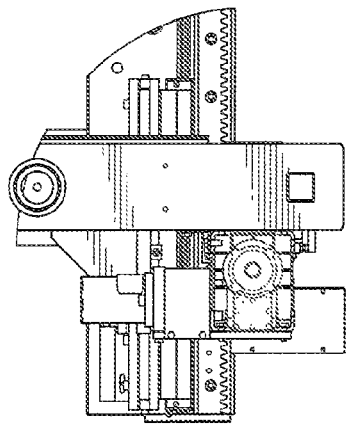
FIG. 5 is a right side view of the material handling feed table shown in FIG. 1.
Figure 4:
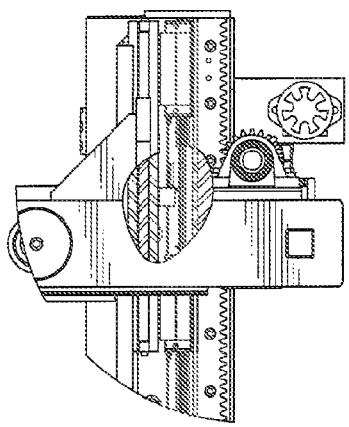
FIG. 4 is a left side view of the material handling feed table shown in FIG. 1.
Figure 6:
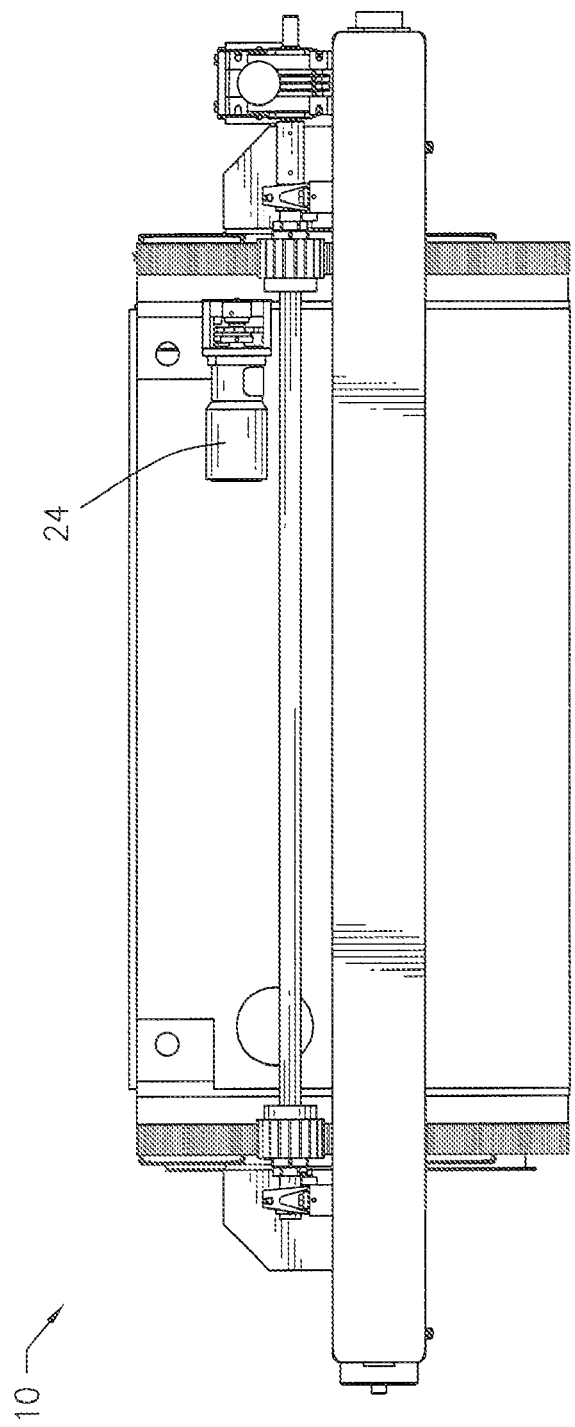
FIG. 6 is a bottom view of the material handling feed table shown in FIG. 1.

FIG. 3 illustrates a front view of the material handling feed table 10, FIG. 4 illustrates a left side view, FIG. 5 illustrates a right side view and FIG. 6 illustrates a bottom view of the feed table 10. The shuttle frame 32 and, accordingly, the jaws 14 and 16 are reciprocated by pinion gears, by a screw drive mechanism or by a continuous loop chain or chains 18 and 20.

A driven conveyor mechanism 22 supports the work piece 30 and moves the work piece as described herein. In a preferred embodiment, the conveyor mechanism 22 includes a plurality of axially aligned rollers 26. The axially aligned rollers 26 are rotated by a power roller drive motor 24. The tangential speed of the rollers 26 is coordinated and operated in conjunction with the movement and positioning of the reciprocating shuttle mechanism 12

Figure 7:
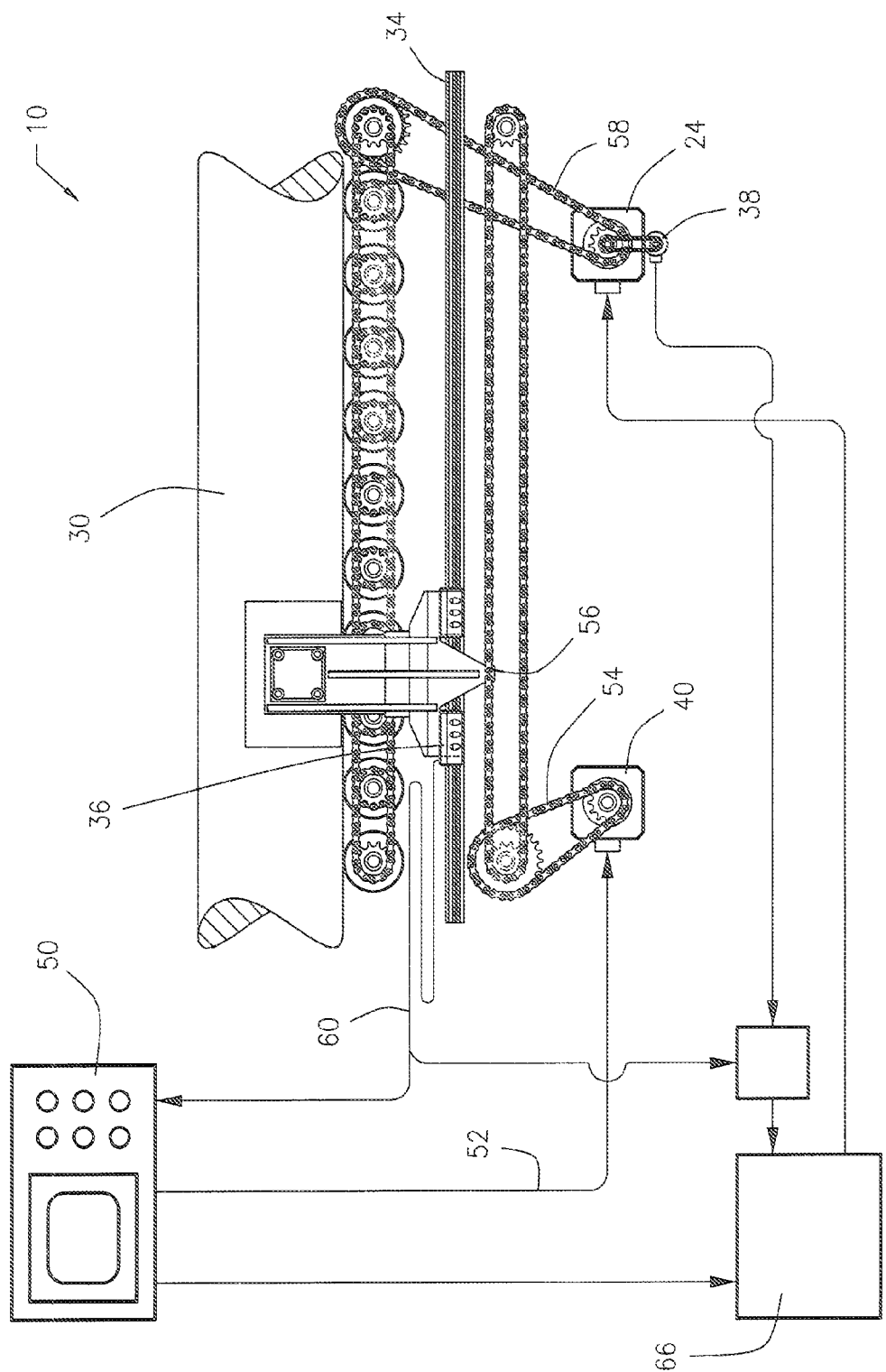
FIG. 7 is a simplified schematic diagram illustrating the operation of the material handling feed table shown in FIG. 1.

FIG. 7 is a simplified schematic diagram illustrating operation of the material handling feed table 10 shown in FIG. 1.

The present invention is directed to two linked or related mechanisms. The two mechanisms are slaved together when the operation requires the two to operate in a coordinated manner. The two mechanisms can also operate independently when desired. Each is an independent mechanism capable of moving materials. By working these two together in a coordinated manner, the combined system can carry material to a process with better power and better accuracy. This arrangement also allows each mechanism to share the work while operating in a manner best suited to its particular mechanical requirements.

The first device is a reciprocating shuttle mechanism 12. The shuttle moves in alternate directions roughly parallel to the axis of the material to be moved. A motor 40 or other power source translates the shuttle along a frame 34 or guiding structure in a controlled manner. A measurement system, such as a linear encoder 36, monitors the shuttle's movement and position.

The shuttle frame 32 carries a set of jaws or grippers 14 and 16 that operate transverse to the motion of vise. These jaws can close across the cross-section of the material 30. The reciprocating shuttle 12 is primarily for materials with a more or less uniform cross-section normal to one axis of indeterminate length. When the jaws are closed upon the material, the material is fixed at one point along the material's length to the contact point within the vise. As the shuttle translates, the material is caused to move along its axis.

The frame 34 is, by nature, of a finite length which limits the maximum distance that the shuttle can move the material. If the process requires a length of material that exceeds the travel length of the shuttle, the reciprocating shuttle can then be opened and repositioned. This allows another length to be carried forward. The process can be repeated until the required length can be carried to the process.

The second mechanism is a driven conveyor mechanism, which is an array of rollers 26, transverse to the axis of the material 30. The rollers 26 in this conveyor are linked together and driven with a motor 24 or other power source, causing the rollers to turn. Thus, the rollers support the material and cause it to move. A measurement system, such as a rotary encoder 38, is connected to the roll drive to gauge the rotation.

The material 30 can rest directly on the circumferential surface of the rollers 26 or on a belt or other carrier, lying tangential between or on the rollers. As the rollers turn, friction between the material and the rollers' surface will move the material at a speed that is approximately equal to the tangential speed of the rollers 26. There is no limit on the motion; the material can be carried over the entire length of the roller array. Additional roller conveyors (not shown) can be arranged in a series to carry the material beyond the structural limits of a single roller conveyor.

In the primary preferred embodiment, shown in FIGS. 1 through 7, the shuttle mechanism is the primary conveyor. The shuttle's position is considered to be an accurate measure of the material's position because the shuttle jaws lock to the material. A primary motion controller 50 directs power through a cable 52 to the shuttle motor 40. The rotational output of the shuttle motor is coupled to a shuttle drive by a speed reducer. This rotary motion passes through the driver shaft and sprocket to the shuttle drive. The shuttle drive is an elongated continuous loop of chain 18 running between the driven sprocket and the idle sprocket, along a path parallel to the guiding structure for the shuttle. The frame 34 is equipped with a linear rail and bearings that support the shuttle while allowing it to move freely along the length. The shuttle structure is equipped with a connection 56 to the shuttle drive chain loop. This arrangement converts the rotary motion produced by the drive motor 40 into linear motion to move the shuttle structure 12 and the jaws 14 and 16 along the frame 34. The linear encoder 36 provides feedback via a line 60 to the motion controller. In operation, the motion controller 50 adjusts the output signal via a cable 52, as the feedback signal requires, allowing the shuttle motion to follow the programmed velocity profile and direct the shuttle to the final position.

The driven conveyor mechanism is used as the secondary conveyor. The array of powered rollers 26 can carry the weight of the material as well as provide a large portion of the pulling force needed to move the mass of the materials. The rollers are linked via the continuous chains so they all rotate at the same rate. A roller motor 24 drives the conveyor and is coupled to the roller array through a reducer 58.

A secondary motion controller 66 is tasked with driving the roller motor 24 at a rate that the tangential velocity of the rollers 26 matches the linear speed of the shuttle. This is accomplished by slaving the secondary controller 66 to the primary controller of the shuttle. The velocity and direction commands are sent to the shuttle drive motor 54 and relayed to the secondary controller by the primary controller. The initial roller velocity command is sent to the powered rollers and scaled from the shuttle command.

In addition, a rotary encoder 38 produces a roller feedback signal. This signal is compared to the shuttle feedback signal from the linear encoder 36. The secondary motion controller 66 uses the error which is difference between the two velocity signals to further refine the speed signal sent to the rolling conveyor drive motor. The error also can be integrated over time to estimate slippage between the two conveyors. This allows the roller conveyor and shuttle conveyor to operate so the load is shared equitably. A derivative of the error allows the secondary drive to detect trends and anticipate the corrective actions that might be needed. The accuracy of the motions is limited by the accuracy of each controller. Coordination is dependent upon the secondary controller 66 following the primary controller 50.

Figure 8:
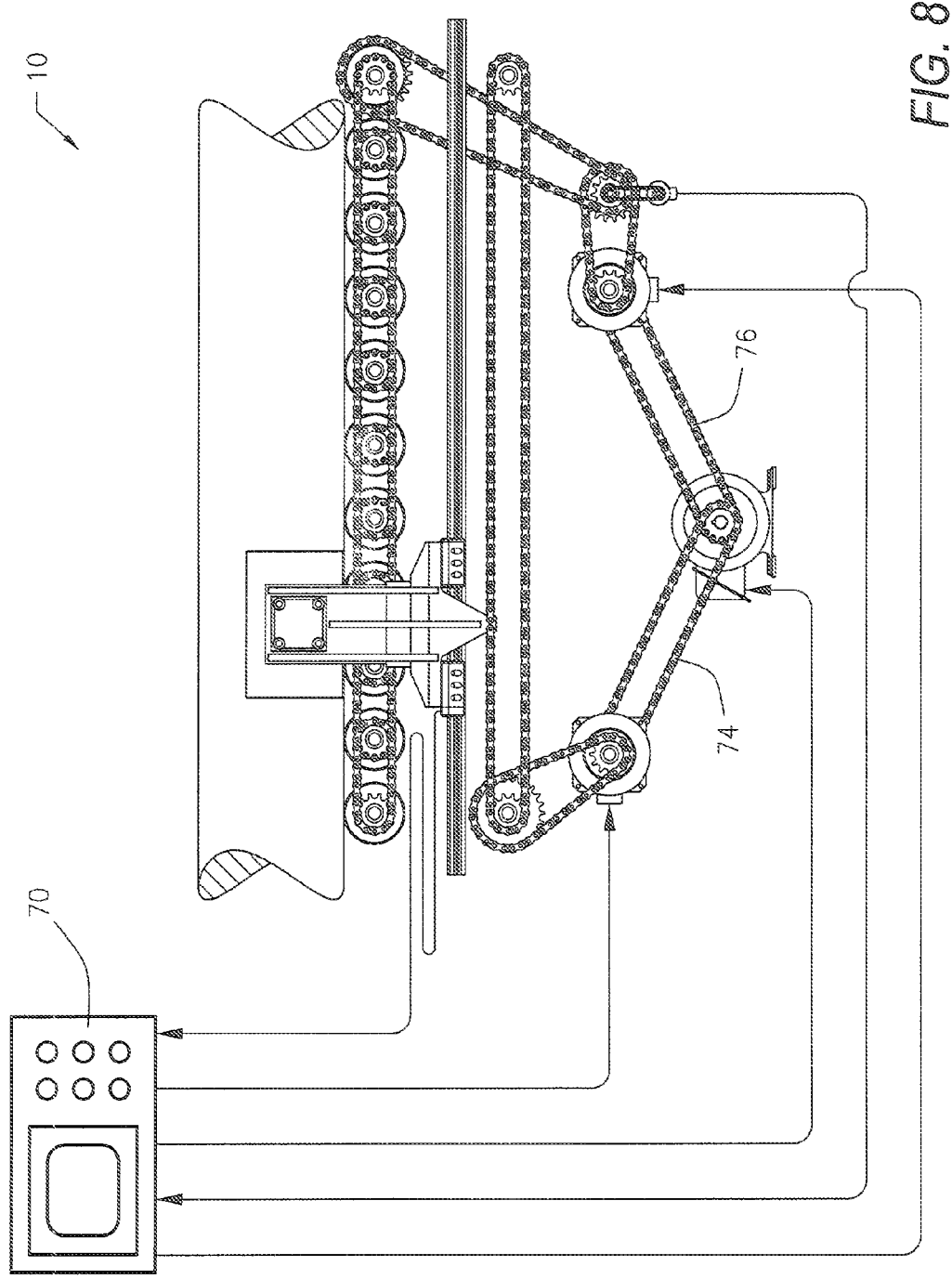
FIG. 8 is a simplified schematic diagram of an alternate embodiment of a material handling feed table in accordance with the present invention.

In an alternate embodiment, shown in FIG. 8, the mechanisms are arranged similarly to the previous embodiment. The difference is the manner in which the conveyors are driven and coordinated.

This alternate method requires only a primary motion controller 70, but this controller drives a single motor 72 powerful enough to drive both conveyors together. A driveline is divided 74 and 76 between the two conveyors. The reduction ratios are adjusted to equalize the speed of the shuttle 12 and the tangential speed of the rollers 26. There is a clutch 78 and 80 in each driveline to direct the power to one conveyor or the other, or both together.

The difference from the previous embodiment is found in the method that the mechanical power is directed the conveyors. The motion controller 70 directs power via a cable 82 to the single motor 72. This motor drives the shuttle by using one half of the driveline 76 through the shuttle clutch 78 on to the speed reducer and to the driven sprocket. From here, the shuttle conveyor construction and function is as described in the embodiment above.

The other half of the driveline 76 powers the roller conveyor. The power turns the input of the roller conveyor clutch 80. To keep the speed of the shuttle equal to the surface speed of the rollers, the ratio of the speed reducer must be adjusted. The rollers' diameter and linkage method of the conveyor can also be adjusted to obtain the final ratio. Again, the roller conveyor construction and function is as described above.

In coordinated operation, the motion controller 70 sets the location and speed of the material 30 by modulating the power to the drive motor 72. Feedback from the linear encoder 36 reports the position and velocity of the shuttle. This information is fed to the motion controller which guides the material's movement through the required motion profile. Mechanical power is transmitted through the half driveline 74 to the shuttle clutch 78 and through the half driveline 76 to the roller clutch 80. Control signals cause both the shuttle clutch and the roller clutch to engage, supplying power from the motor 72 to both conveyors.

When the operation requires that the shuttle move without moving the rollers, then the motion controller 70 directs a control signal to engage the shuttle clutch 78 and control signal to disengage the roller clutch 80, idling the rollers in the conveyor. The motion controller also modulates the power signal to the motor 72 to set the conveyor speed. The linear encoder reports the shuttle position feedback to the controller 70.

To operate the roller conveyor without moving the shuttle, the motion controller 70 directs control signal to engage the roller clutch 80 and control signal to disengage the shuttle clutch. The motion controller also modulates the power signal to the motor 72 to set the conveyor speed. The motion controller can run the roller speed in an open loop condition, or an optional roller encoder can be used to provide velocity feedback to the motion controller.

In this alternate embodiment, the coordination between the conveyors is assured by direct mechanical linkage and accuracy is limited by the backlash within each section.

Whereas, the present invention has been described in relation to the drawings attached hereto, it should be understood that other and further modifications, apart from those shown or suggested herein, may be made within the spirit and scope of this invention.

What is claimed is:

1. A material handling feed table which comprises:
   a driven conveyor mechanism to both support and move a work piece along an axis wherein the driven conveyor mechanism includes a plurality of axially aligned rollers rotated by a power roller drive motor having a shaft and a continuous chain engaging said plurality of axially aligned rollers wherein said driven conveyor mechanism moves along an axis aligned with said axis of said moving work piece;
   a reciprocating shuttle mechanism which includes a pair of jaws to clamp and move said work piece, wherein said shuttle mechanism moves in directions roughly parallel to said axis of the moving work piece; and
   a mechanism to coordinate and operate movement of the driven conveyor mechanism in conjunction with movement and positioning of the reciprocating shuttle mechanism, wherein the tangential velocity of said plurality of axially aligned rollers is coordinated and operated in conjunction with the positioning and linear speed of said reciprocating shuttle mechanism.

2. A material handling feed table as set forth in claim 1 wherein the reciprocating shuttle mechanism includes a pair of opposing jaws, wherein either of said opposing jaws extend and retract.

3. A material handling feed table as set forth in claim 2 wherein the pair of jaws open and close transverse to movement of said reciprocating shuttle mechanism.

4. A material handling feed table as set forth in claim 2 wherein the pair of jaws are driven by pinion gears.

5. A material handling feed table as set forth in claim 2 wherein the pair of jaws are driven by a motor which is coupled to a continuous chain.

6. A material handling feed table as set forth in claim 2 wherein the mechanism to coordinate and operate movement includes a linear encoder to provide velocity and position data of said pair of jaws, and a motion controller in communication with the linear encoder.

7. A method to move a work piece on a material handling feed table, which method comprises:
   moving and supporting a work piece on a material handling feed table with a driven conveyor mechanism along an axis wherein said driven conveyor mechanism includes rotating a plurality of axially aligned rollers with a power roller drive motor which engages a continuous chain;
   clamping and moving said work piece on said material handling feed table with a reciprocating shuttle mechanism along said axis, wherein said reciprocating shuttle mechanism includes a pair of jaws; and
   coordinating and operating movement of the driven conveyor mechanism with the reciprocating shuttle mechanism, wherein the tangential velocity of said plurality of axially aligned rollers is coordinated and operated in conjunction with the positioning and linear speed of said reciprocating shuttle mechanism to providing simultaneous movement of said work piece.

8. A material handling feed table which comprises:
   a driven conveyor mechanism to both support and move a work piece along an axis wherein the driven conveyor mechanism includes a plurality of axially aligned rollers rotated by a power roller drive motor having a shaft and a continuous chain engaging said plurality of axially aligned rollers;
   a reciprocating shuttle mechanism which includes a pair of jaws to clamp and move said work piece, wherein said shuttle mechanism moves in directions roughly parallel to said axis of the moving work piece; and
   a mechanism to coordinate the tangential velocity of said plurality of axially aligned rollers of the driven conveyor mechanism in conjunction with the positioning and linear speed of the reciprocating shuttle mechanism, wherein said mechanism includes a linear encoder to provide velocity and position dates of said pair of jaws, a primary motion controller in communication with the linear encoder, and a secondary motion controller slaved to the primary motion controller.

* * * * *